United States Patent [19]

Franz

[11] 4,066,430
[45] Jan. 3, 1978

[54] METHOD OF TEMPERING IN A FLUIDIZED QUENCHING MEDIUM

[75] Inventor: Helmut Franz, Pittsburgh, Pa.
[73] Assignee: PPG Industries, Inc., Pittsburgh, Pa.
[21] Appl. No.: 745,279
[22] Filed: Nov. 26, 1976
[51] Int. Cl.² ............................................. C03B 27/00
[52] U.S. Cl. ..................................... 65/116; 65/114; 165/104 M; 165/104 F
[58] Field of Search ................. 65/114, 116, 348, 349, 65/350; 165/104 M, 104 F

[56] References Cited

U.S. PATENT DOCUMENTS

| | | | |
|---|---|---|---|
| 342,260 | 5/1886 | Kelsey | 65/114 |
| 2,113,279 | 4/1938 | Olin et al. | 264/14 |
| 2,738,548 | 3/1956 | Kassel | 260/14 |
| 2,751,756 | 6/1956 | Hughes et al. | 165/104 F X |
| 3,070,837 | 1/1963 | Loertscher et al. | 264/7 |
| 3,075,580 | 1/1963 | Davis, Jr. | 165/104 F X |
| 3,202,731 | 8/1965 | Grevenstuk et al. | 264/7 |
| 3,223,501 | 12/1965 | Fredley et al. | 65/25 A |
| 3,293,014 | 12/1966 | Callender et al. | 65/21 |
| 3,313,608 | 4/1967 | Guyer et al. | 65/21 |
| 3,332,759 | 7/1967 | McMaster et al. | 65/25 A |
| 3,393,155 | 7/1968 | Schutte et al. | 252/316 |
| 3,423,198 | 1/1969 | McMaster et al. | 65/114 X |
| 3,550,920 | 12/1970 | Geipel | 165/104 F X |
| 3,621,905 | 11/1971 | Hedstrom | 165/104 F X |
| 3,710,510 | 1/1973 | Tully et al. | 47/58 |
| 3,764,403 | 10/1973 | Neely et al. | 148/13.1 |
| 3,791,987 | 2/1974 | Fanger | 252/316 |
| 3,843,340 | 10/1974 | Cone | 65/21 |
| 3,883,339 | 5/1975 | Michalik et al. | 65/114 |
| 4,008,170 | 2/1977 | Allan | 252/194 |
| 4,009,017 | 2/1977 | Jones | 165/104 F X |

OTHER PUBLICATIONS

Degussa Technical Bulletin, No. 3100, Degussa Inc. Pigments Division, 2 Penn Plaza, N.Y., N.Y. 10001.
Cabot Corp., Silanox Brochure, 125 High St., Boston, Mass. 02110.
Tulco, Inc. Tullanox 500 Brochure, North Billerica, Mass.

*Primary Examiner*—Arthur D. Kellogg
*Attorney, Agent, or Firm*—Dennis G. Millman

[57] ABSTRACT

Heated articles may be rapidly and uniformly quenched in a fluidized bed of a dispersion of water and hydrophobic colloidal silica.

21 Claims, 5 Drawing Figures

METHOD OF TEMPERING IN A FLUIDIZED QUENCHING MEDIUM

BACKGROUND OF THE INVENTION

This invention relates to the art of quenching, that is, the removal of heat from an article, usually at a rapid rate, in order to alter its physical properties or simply to cool it. Although not limited to such, the glass and metals industries are the major users of quenching processes. With glass, quenching is used in the tempering process to rapidly cool a heated piece of glass so as to cause the formation of a surface layer stressed in compression which strengthens the glass. Metals are quenched to rearrange their crystal structures and thereby harden the metals. Another application of quenching is for the purpose of quickly solidifying thermoplastic articles immediately after shaping so as to permit handling thereof. An example of this latter application is the catching of falling droplets of molten material such as glass, metal, plastic, or bituminous materials.

Quenching has been carried out in the prior art with a wide variety of fluids, most commonly air, water, or oils. Examples of more exotic quenching media are sublimable particles (e.g., frozen $CO_2$) as disclosed in U.S. Pat. No. 3,764,403 to Neely and streams of plastic particles as disclosed in U.S. Pat. No. 3,423,198 to McMaster. For most quenching purposes, it is desirable for the quenching fluid to provide a maximized rate of heat transfer from the article being quenched, but it is also usually important for the cooling to take place as uniformly as possible to avoid the creation of unbalanced stresses in the article which may weaken or even break the article. Water is capable of producing very rapid cooling rates, but surface boiling phenomena which accompany water quenching cause abrupt, localized changes in the heat transfer rate which lead to imbalanced stress conditions in the article and sometimes breakage. Therefore, water is not a suitable quenching medium for many materials which cannot withstand such stresses. The use of viscous liquids such as oils have been resorted to in order to obtain more uniform heat transfer, but with some reduction in the rate of heat transfer. However, perhaps the greatest drawback to oils and the like as quenching media is the need to subsequently wash the articles to remove the quenching liquid from their surfaces. Air has a relatively low heat transfer coefficient and therefore usually requires high velocities to be useful as a quenching medium. Such high velocity streams of air are difficult to apply to an article uniformly, and even with the highest practical air velocites, the heat transfer rates obtained are seldom as high as those obtained with liquids and considerably less than with water. Moreover, the buffeting caused by high velocity streams of air can sometimes cause distortion in heat-softened glass.

Numerous proposals have been made to utilize particulate materials entrained in or fluidized by air as heat transfer media. The particulate materials proposed have included finely divided alumina or silica, fine sand, metallic powders, powdered graphite, and plastic particles as disclosed in U.S. Pat. No. 3,423,198. While such materials have been able to improve the heat transfer rate of air alone, they generally do not provide rates as high as liquids. Additionally, the impact of solid aggregates against the surfaces of the articles being quenched can produce defects in some articles, especially glass. Also, adhesion of powdered materials to the articles being quenched can sometimes be a problem. This adhesiveness has been deliberately employed to coat falling droplets with fluidized beds of coating materials as shown in U.S. Pat. Nos. 3,070,837; 3,202,731; and 3,791,987.

U.S. Pat. No. 3,764,403 discloses a quenching method which utilizes solid particles while avoiding distortion-causing impacts. This is accomplished by using particles which are sublimable solids, such as frozen carbon dioxide, which behave like solids in improving heat transfer through the gas boundary layer at the surface of the article being quenched, but which instantly sublime to the gaseous state as they approach the hot surface of the article itself, thereby muting any impact effect. Such an approach is limited in its acceptability by the high cost of the sublimable particles which are expended and escape as gases. It would be highly desirable if such a soft-impact particulate quenching medium capable of being recirculated were available.

The quenching medium of the present invention is a fluidized dispersion of water in hydrophobic colloidal silica. Hydrophopic colloidal silica is a commercially available product used in a wide variety of applications such as anti-caking agent in granular materials, water-repellancy additive in paints and sealants, and reinforcing agent in polymers. The formation of a dispersion of water in hydrophobic colloidal silica has been disclosed in U.S. Pat. No. 3,393,155, and the utility for such dispersions are indicated therein to be as fire extinguishing agents, for treating papers and textiles, and for use in rubbers or plastics or polymer dispersions. It has also been disclosed in U.S. Pat. No. 3,710,510 that dispersions of water in hydrophobic colloidal silica may be used to germinate seeds. These prior art dispersions inherently include substantial amounts of air and are in a fluid-like state, but not in a state of dynamic fluidization as used in the present invention. Furthermore, the prior art did not recognize the potential as a quenching medium for such dispersions when fluidized.

SUMMARY OF THE INVENTION

The present invention is the discovery that a fluidized dispersion of water in hydrophobic colloidal silica possesses remarkable properties as a quenching medium. The major part by weight of such a dispersion is water, as much as about 96 percent by weight, and therefore can be made to exhibit heat transfer rates approaching that of water. But because the dispersion displays all the outward aspects of a fluffy, dry powder, the surface boiling problems of water are avoided. The dispersion is formed of tiny droplets of water (on the order of about 20 microns in diameter) covered with sub-micron sized particles of hydrophobically modified silica, thereby providing a mutual repulsion between adjacent water droplets. These dispersed droplets appear to behave as solid particles in penetrating stagnant fluid boundary layers at the surface of articles being quenched, but because these dispersed units are of a colloidal magnitude, they have very low mass and therefore avoid impingement-caused defects associated with other systems of suspended particulates. Moreover, the quenching medium of the present invention readily lends itself to recirculating systems, there being a need only to replace small amounts of water which may be lost by evaporation.

In order to attain the benefits of the present invention, a dispersion of hydrophic colloidal silica must be fluidized, that is, it must be subjected to mechanical agitation. Agitation may be provided in many ways including shaking, pumping, spraying, or cascading. The more kinetic energy imparted to the dispersion, the greater the rate of heat transfer will be. Static beds of the dispersion have been found to exhibit heat transfer coefficients only slightly better than that of still air. Gently agitating such a bed raises the heat transfer coefficient to a level approximately equivalent to that of a typical quenching oil. Pumping a fluidized, freely falling stream of the dispersion onto a surface can yield a heat transfer coefficient approaching that of a water quench.

THE DRAWINGS

DETAILED DESCRIPTION

Figure 1:
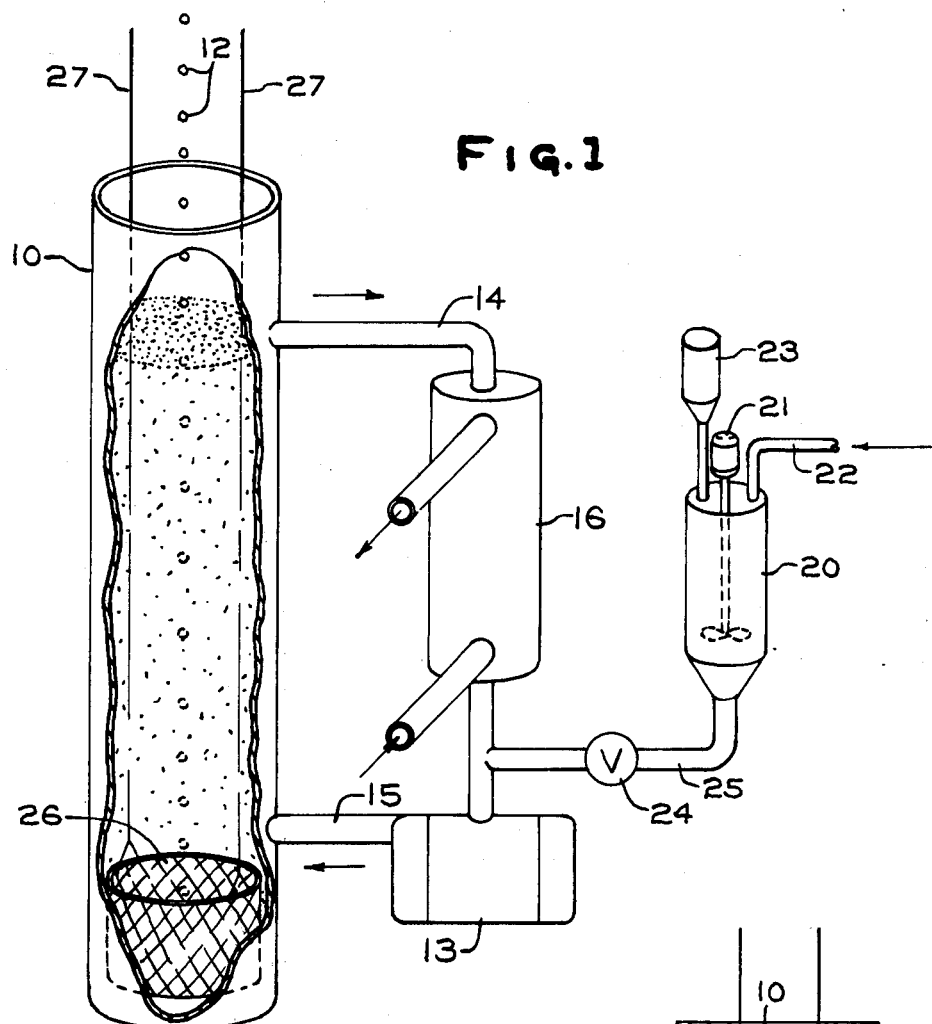
FIG. 1 is a perspective view, partly broken away, of a fluidized quenching bed for catching freely falling droplets of molten material.

Colloidal silica (also known as fumed silica or pyrogenic silica) is a hydrophilic powder typically produced by flame hydrolysis of silicon compounds as described in U.S. Pat. No. 2,990,249. In order to render the silica particles hydrophobic, it is known to react the silica with compounds containing hydrocarbon groups (preferably an organosilane) so as to replace hydroxyl groups at the surface of the silica particles with the hydrocarbon containing compounds. An example of such a reaction may be found in U.S. Pat. No. 2,993,809. Hydrophobic colloidal silica is available commercially as "Silanox 101" from the Cabot Corporation, Boston, Mass., "Tullanox 500" from Tulco, Inc., North Billerica, Mass., and "Aerosil R-972" from Degussa, Frankfurt, Germany.

The creation of a dispersion of water in hydrophobic colloidal silica is disclosed in U.S. Pat. No. 3,393,155 and that disclosure is hereby incorporated by reference. The technique employed there is to vigorously shake water and hydrophobic silica in a closed container, but the technique preferred here has been to employ a blender for about 5 to 10 seconds. The blender used had a blade speed of 18,000 to 21,000 revolutions per minute. In general, the dispersion is effected when water is broken up into small droplets (estimated to be on the order of about 20 microns) by the application of high shear forces. The silica particles surround the droplets and their hydrophobicity prevents coalescence of the water droplets. The result is a white, free-flowing, powdery dispersion which appears and feels dry despite its being comprised largely of water. The preferred water to silica ratio may vary slightly from one particular hydrophobic silica product to another; with Silanox 101 (a trimethyl silane treated silica) dispersions containing 4 percent by weight silica and 96 percent water were found to contain the minimum amount of silica to maintain a stable dispersion. A preferred composition includes 5 percent by weight silica and 95 percent by weight water. Good dispersions have been obtained with as much as 10 percent by weight silica, and even greater amounts could be employed, but there is generally no justification for using more silica than the minimum necessary to establish a good dispersion. Moreover, a great excess of silica would be lost from the dispersion as dust when the dispersion is fluidized. The dispersing effect of various amounts of hydrobic silica may be seen in Table I, where the measured densities of the various dispersions reflect the degree of dispersion (the greater the repulsion between dispersed droplets, the lower the density).

TABLE I

| Hydrophobic colloidal silica* (% by weight) | Water (% by weight) | Density (gm/cm$^3$) |
| --- | --- | --- |
| 0 | 100 | 1.00 |
| 3 | 97 | 0.61 |
| 4 | 96 | 0.56 |
| 5 | 95 | 0.50 |
| 6 | 94 | 0.41 |
| 7 | 93 | 0.31 |
| 8 | 92 | 0.26 |
| 9 | 90 | 0.23 |
| 10 | 90 | 0.23 |
| 13 | 87 | 0.21 |
| 15 | 85 | 0.20 |
| 100 | 0 | 0.048 |

*Silanox 101

When properly formed, a dispersion of water in hydrophobic colloidal silica may remain stable for several months with no need for further agitation, although some water loss through evaporation may occur.

Fluidizing the water-in-silica dispersion entails a continuous agitation of the dispersion so as to maintain each of the dispersed droplets in a fluid state of motion. Fluidizing may be achieved by a number of means including mechanical stirrers, air streams, and shakers, but the preferred mode is to pump the fluid in a recirculating pattern by means of a diaphragm pump or any other pump suitable for handling solid dispersions, slurries, etc. The dispersion, when still, includes a substantial amount of air, but when fluidized, the dispersed particles are suspended in constant motion with additional amounts of air. Going from a static state to the fluidized state, a bed of the dispersion may be observed to at least double in volume due to the inclusion of additional air. When the fluidizing agitation is stopped, the bed settles back to its original volume within a few seconds, although still remaining a dispersion. Fluidization may be increased to some advantage up to the point sometimes encountered where the agitation becomes so vigorous that air pockets are formed in the bed. This is particularly characteristic of air streams as the fluidizing means. Because such air pockets render the fluidized bed non-homogeneous, thereby causing non-uniform heat transfer, overly vigorous fluidization in such a case should be avoided for most quenching operations.

The heat transfer properties of the fluidized dispersion are markedly better than those of the static dispersion, but even faster rates of heat transfer can be attained if the dispersion is provided with an externally induced flow over the heat transfer surface. Although higher velocities will produce greater increases in heat transfer, dramatic results have been obtained with low pressure, gently cascading streams of the fluidized dispersion. This compares with the high pressure blasts often required of air quenches which can lead to surface distortion of heat-softened articles.

The following table compares the quench rates obtained with air, oil, water, and the water-silica dispersion of the present invention in various states of agitation. The article quenched in each example was a 2 inch (5.08 centimeters) square steel plate ¼ inch (6.35 millimeters) thick. The dispersion in each case was 95 percent by weight water and 5 percent by weight Silanox 101. In Example 4, the dispersion was fluidized by a pair of rotating paddles at the bottom of the fluidized bed which produced only a slight bulk flow around the plate. In Example 5, the dispersion was fluidized by establishing a recirculating flow with a diaphragm pump, the output stream of the pump being directed toward the surfaces of the plate from opposite sides to continuously flow the quench medium over the surfaces of the plate.

TABLE II

| Example No. | Quench Medium | Temperature Drop | Time | Average Rate of Temperature Drop |
|---|---|---|---|---|
| 1. | Air (still) | 1300° F. to 720° F. (704° C. to 382° C.) | 90 seconds | 6.44° F./sec. (3.58° C./sec.) |
| 2. | Water-silica dispersion (not fluidized) | 1300° F. to 610° F. (704° C. to 321° C.) | 80 seconds | 8.63° F./sec. (4.79° C./sec.) |
| 3. | Methyl silicone oil bath (still) | 1300° F. to 510° F. (704° C. to 266° C.) | 38 seconds | 20.79° F./sec. (11.55° C./sec.) |
| 4. | Water-silica dispersion (fluidized) | 1300° F. to 260° F. (704° C. to 127° C.) | 50 seconds | 20.80° F./sec. (11.56° C./sec.) |
| 5. | Water-silica dispersion (fluidized and flowing) | 1300° F. to 350° F. (704° C. to 177° C.) | 18 seconds | 52.78° F./sec. (29.32° C./sec.) |
| 6. | Water bath (still) | 1300° F. to 390° F. (704° C. to 199°C.) | 6 seconds | 151.67° F./sec. (84.26° C./sec.) |

Figure 2:
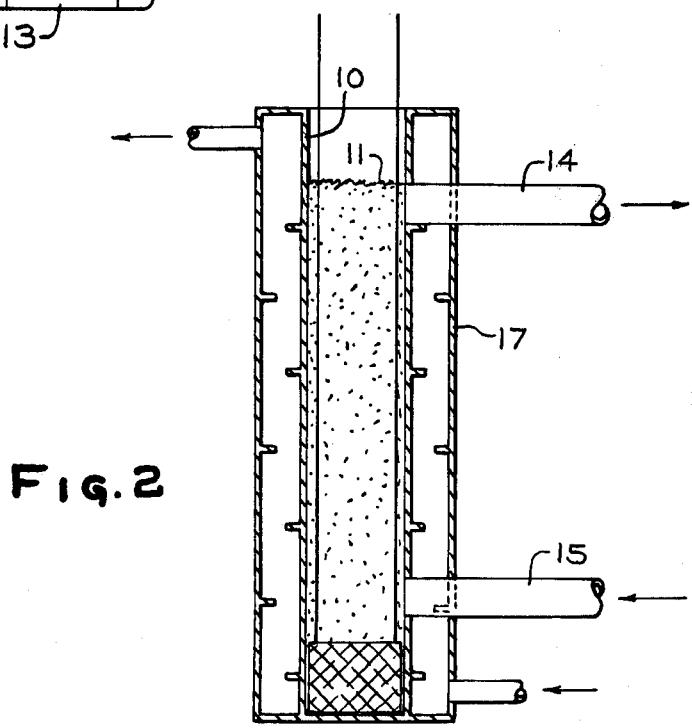
FIG. 2 is a cross-sectional view of a modification of the FIG. 1 arrangement employing a quenching vessel having a cooling jacket.

FIG. 1 depicts one embodiment in which the quenching medium of the present invention may be used, viz., to catch and cool falling droplets of molten material so as to freeze them in their spherical shape before they land. A specific process with which such a quenching arrangement can be used to considerable advantage is the production of glass beads as disclosed in U.S. Pat. No. 3,843,340 to E. J. Cone. An open-topped quenching vessel 10 holds a quantity of quenching medium 11 consisting of a fluidized dispersion of water in hydrophobic colloidal silica into which a stream of molten droplets 12 is falling. Fluidized bed heights of at least 4 to 6 inches (10 to 15 centimeters) but less than four feet (1.2 meters) have been found effective for catching glass beads. No adhesion of the silica to the beads was observed. The quenching medium is fluidized by means of a diaphragm pump 13 which draws the medium from the top of the bed through an outlet pipe 14 and returns the medium near the bottom of the quenching vessel by way of an inlet pipe 15. In order to prevent excessive heat accumulation in the quenching medium, which could result in steam formation and a loss of water from the dispersion, the quenching medium may be passed through a heat exchanger such as the water or air cooled jacket 16 shown in FIG. 1. Alternatively, the quenching vessel itself may be provided with a cooling jacket 17 as shown in FIG. 2. For some short batch runs a heat exchanger may not be necessary since the quenching medium does exhibit a substantial heat capacity. In order to make up for any loses of quenching medium from the system, which would ordinarily be slight, a mixing tank 20 is shown in FIG. 1 where additional quantities of the water-silica dispersion may be blended and periodically added to the system if necessary. The mixing tank includes a high speed mixer 21, a source of water 22, and a hopper 23 for holding and dispensing a supply of hydrophobic silica. The make-up dispersion may be introduced into the main circulating stream by opening valve 24 in pipe 25. A simple semi-batch system for collecting the beds is shown in FIG. 1, consisting of a basket 26 which may be periodically hoisted by means of a pair of cables 27 and emptied of its contents. Usually very little of the dispersion escapes through the open top of the quenching vessel, but as a precautionary measure it may be desirable to provide suction means near the top of the vessel to scavenge any stray material.

The arrangement shown in FIG. 1 may also be used to quench a large number of small articles simultaneously by heating the articles together in a rack or basket, such as basket 26, and then plunging the rack or basket into the fluidized quenching medium in the quenching vessel 10. Because the fluidized quenching medium flows like a liquid, it is able to come into contact with all sides of each article in a batch almost instantly, but the drawbacks of liquid quenching media such as drag-out, spotting, and the need for subsequent washing are avoided.

Figure 3:
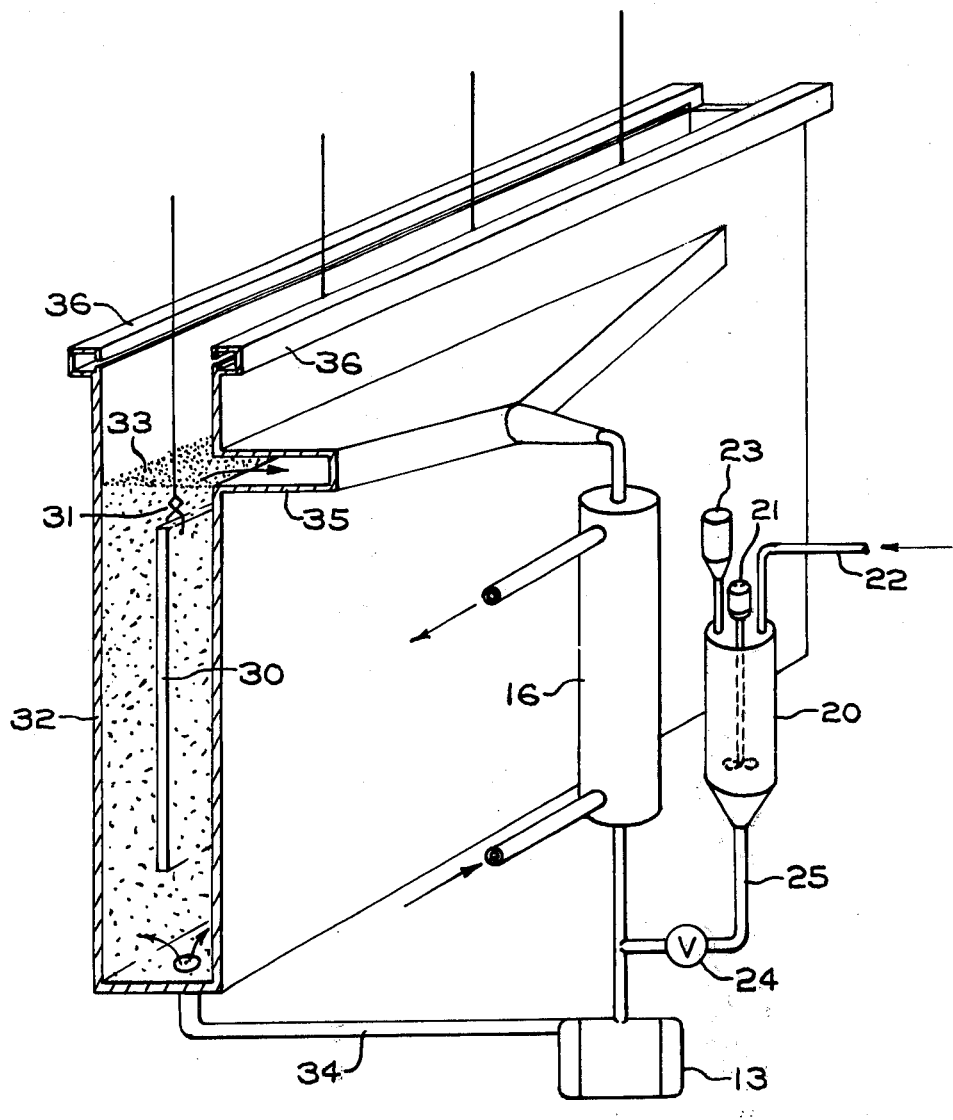
FIG. 3 is a perspective, cross-sectional view of a fluidized quenching system for sheet materials such as glass sheets in which the sheets are carried in a vertical orientation by tongs.

Another example of a quenching operation which may utilize the quenching medium of the present invention is shown in FIG. 3. Depicted there is a system for quenching sheet materials, such as in the tempering of glass sheets, wherein the sheets are heated and then rapidly quenched to cool their surfaces before the center portion cools. In the arrangement of FIG. 3, a heated sheet of glass 30 is suspended by tongs 31 and is lowered into an elongated quenching chamber 32 containing a fluidized bed of quenching medium 33. Fluidization is achieved by pumping the quenching medium in at the bottom of the chamber by way of inlet pipe 34 and withdrawing it at the top through manifold 35. Alternatively, the flow may be in the reverse direction, with the quenching medium cascading downwardly over the sheet and being withdrawn at the bottom. The circulation system includes a diaphragm pump 13, heat exchanger 16, and make-up mixing tank 20 as described above in connection with the FIG. 1 embodiment. Also shown in FIG. 3 are an optional pair of slotted suction tubes around the top of the quenching chamber for collecting any quenching medium which might escape. In some cases it may be desirable to provide a plurality of inlet pipes at spaced locations to produce more uniform flow rates within the quenching chamber. If more rapid flow rates are desired, the quenching medium may be impinged upon the sheet of glass or other material from a large number of spaced apart nozzles extending normal to the major surfaces of the sheet. Another alternate method of applying the quenching medium is to introduce the sheet into the quenching chamber while the chamber is empty, and then suddenly flood the chamber with quenching medium from a storage tank. Such a technique may improve uniformity of the quench.

Figure 4:
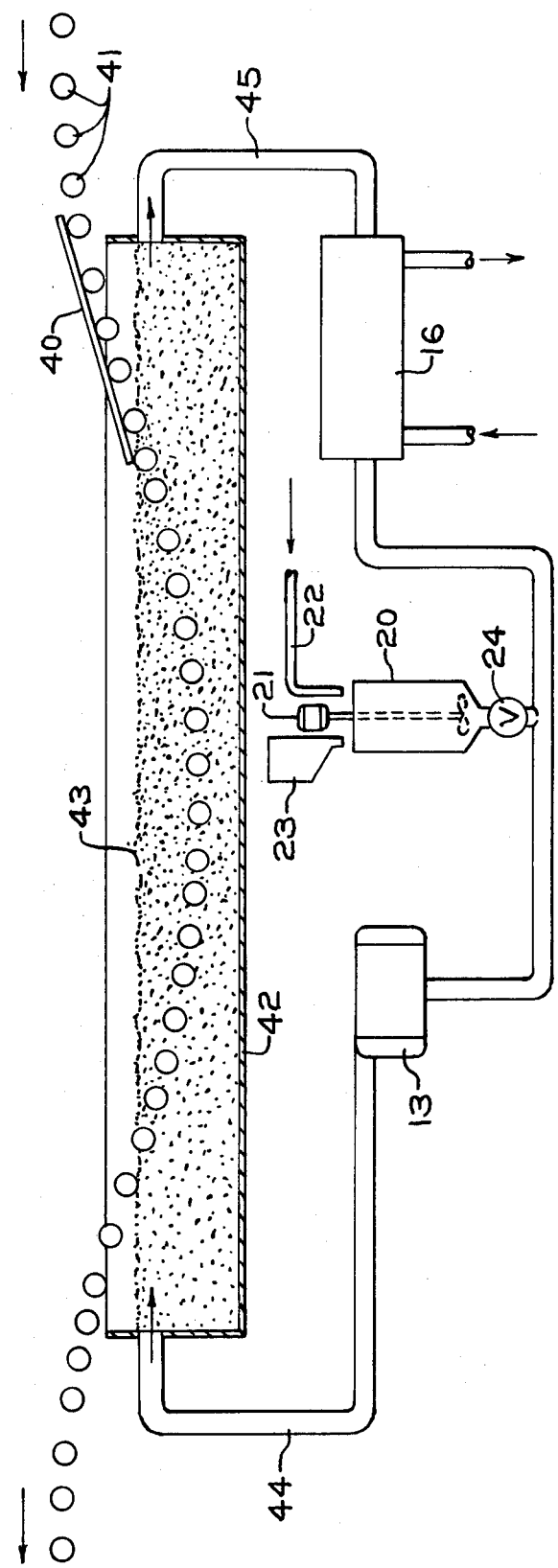
FIG. 4 is a longitudinal cross-sectional view of a fluidized quenching arrangement for continuously quenching sheet materials carried on a roller conveyor.

FIG. 4 shows yet another manner in which the quenching medium of the present invention may be utilized. Articles such as a glass sheet 40 or a continuous ribbon of metal may be conveyed in a horizontal orientation on a roller conveyor 41 into a shallow, elongated quenching tank 42. The conveyor dips below the level of a bed of fluidized quenching medium 43 within tank 42 so that articles may be continuously conveyed as they are immersed and then removed from the quenching medium. The fluidizing recirculation system is essentially the same as that described above, including an inlet pipe 44, an outlet pipe 45, heat exchanger 16, make-up tank 20, and diaphragm pump 13.

Figure 5:
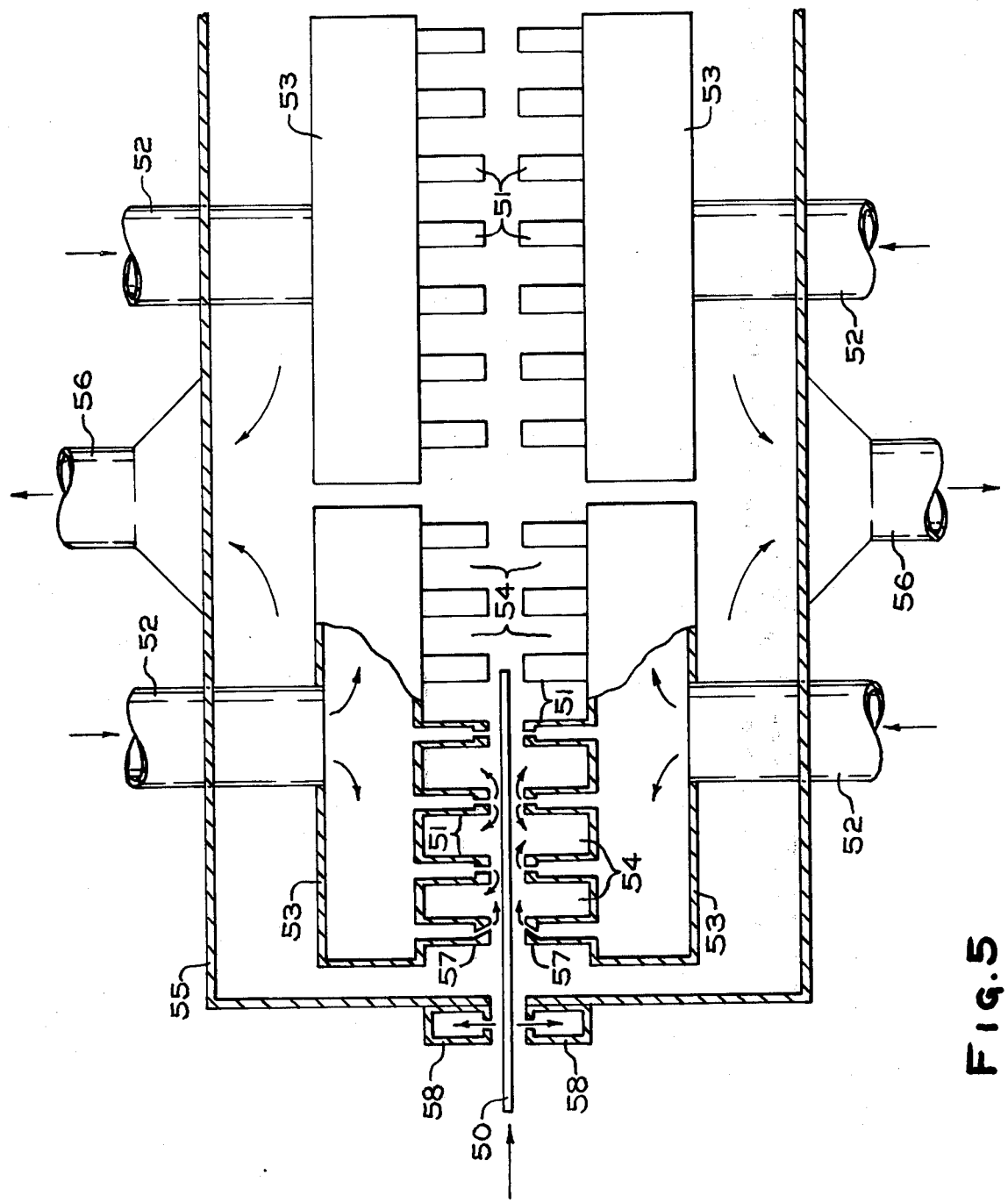
FIG. 5 is a longitudinal cross-sectional view of a blast quenching apparatus wherein sheet materials are quenched while provided with gaseous support.

The process for thermally tempering glass sheets wherein the sheets are supported on a layer of gas as they are conveyed and treated is well known in the art, examples of which may be found in U.S. Pat. No. 3,223,501 to Fredley et al. and U.S. Pat. No. 3,332,759 to McMaster et al. Such a system may be adapted to the present invention by replacing the air usually used in the quench zone with the fluidized dispersion of the present invention as the supporting and cooling fluid. A schematic representation of a portion of such a system is shown in FIG. 5. A sheet of glass 50 passes longitudinally between a plurality of opposed upper and lower quench nozzles 51 which are in the form of transversely extending slots. The quenching medium is pumped through a number of supply conduits 52 to a corresponding number of plenums 53, each of which in turn communicates with a group of the slot nozzles 51. The quenching medium issues from the nozzles, flows over the glass surfaces and escapes into the spaces between adjacent nozzles. The quench zone is provided with an enclosure 55 so that the escaping quenching medium may be contained and recycled by way of exhaust conduits such as a pair of ducts 56. Since the rate of heat transfer is considerably higher than air, the dispersed quenching medium of the present invention need not be applied with the high pressure, high velocity blasts often required of air quenches. Rather, the quenching medium may be supplied with merely enough pressure to support the sheets and to maintain a gently circulating cloud-like atmosphere of the quenching medium within the enclosure 55. Some precautions should be taken to prevent escape of the quenching medium at the entrance and exit openings to the enclosure 55. One means to prevent such escape is shown in FIG. 5, wherein a pair of nozzles 57 near the entrance are angled inwardly to direct the quenching medium away from the vicinity of the entrance. Additional means, such as a pair of suction slots 58, may be provided adjacent to the openings to scavenge any quenching medium which may escape.

The invention is not limited to the specific examples which have been disclosed herein for the purpose of illustration. Modifications and variations which are known to those of skill in the art may be resorted to without departing from the spirit and scope of the invention as defined by the appended claims.

I claim:

1. A method of quenching a heated article comprising contacting the article with a fluidized dispersion of water in hydrophobic colloidal silica having a temperature lower than that of said heated article and maintaining said contact for a sufficient period of time to reduce the temperature difference between said heated article and said fluidized dispersion.

2. The method of claim 1 wherein said dispersion includes a water to silica weight ratio of about 90 to 96 percent water to about 4 to 10 percent hydrophobic colloidal silica.

3. The method of claim 1 wherein the dispersion of water in hydrophobic colloidal silica is maintained as a fluidized bed within an open-topped vessel, and said contacting step is carried out by immersing the article being quenched into the fluidized bed.

4. The method of claim 3 wherein said article is a droplet of heat-softened material, and the droplet is introduced into the fluidized bed as it is freely falling, thereby solidifying the droplet in a spherical shape.

5. The method of claim 4 wherein said droplet is molten glass.

6. The method of claim 3 wherein the article being quenched is carried by support means which are lowered into the fluidized bed to effect said immersion.

7. The method of claim 6 wherein said article is a sheet and the support means carries the sheet by gripping it with tongs.

8. The method of claim 7 wherein said sheet is heated glass and the quenching is carried out so as to temper the glass sheet.

9. The method of claim 6 wherein a plurality of articles is carried by a support means and lowered into the fluidized bed simultaneously.

10. The method of claim 3 wherein the article being quenched is carried into the fluidized bed on conveyor means which provide a continuous path into and out of the fluidized bed.

11. The method of claim 10 wherein said conveyor is a roller conveyor and continuously conveys sheet material into and out of the fluidized bed.

12. The method of claim 11 wherein a continuous flexible sheet is conveyed into and out of the fluidized bed on the roller conveyor.

13. The method of claim 11 wherein a plurality of discrete sheets is conveyed into and out of the fluidized bed on the roller conveyor.

14. The method of claim 3 wherein the fluidized state of the dispersion of water in hydrophobic colloidal silica is maintained by pumping the dispersion in a recirculating flow pattern.

15. The method of claim 14 wherein the dispersion is pumped into the vessel at a bottom zone thereof and drawn off at an upper zone of the vessel.

16. The method of claim 14 wherein heat is extracted from the dispersion by passing it through a heat exchanger outside the vessel.

17. The method of claim 3 wherein heat is extracted from the fluidized bed by means of a heat exchanger.

18. The method of claim 17 wherein the heat exchange is carried out by means of a cooling jacket on the vessel.

19. The method of claim 3 wherein the fluidized dispersion is provided with a bulk flow over the surfaces of the article being quenched.

20. The method of claim 1 wherein the fluidized dispersion of water in hydrophobic colloidal silica is impinged upon the surface of the article being quenched through a plurality of nozzles.

21. The method of claim 20 wherein the article being quenched is a sheet of glass and is supported in spaced relation to the nozzles underlying the sheet by the fluid pressure of the streams being discharged by said underlying nozzles.

* * * * *